US006863943B2

(12) United States Patent
Wang et al.

(10) Patent No.: US 6,863,943 B2
(45) Date of Patent: Mar. 8, 2005

(54) SEMICONDUCTING OXIDE NANOSTRUCTURES

(75) Inventors: Zhong Lin Wang, Marietta, GA (US); Xiangyang Kong, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 10/756,913

(22) Filed: Jan. 13, 2004

(65) Prior Publication Data

US 2004/0185251 A1 Sep. 23, 2004

Related U.S. Application Data

(60) Continuation-in-part of application No. 10/211,696, filed on Aug. 2, 2002, which is a division of application No. 10/042,868, filed on Jan. 8, 2002, now Pat. No. 6,586,095.
(60) Provisional application No. 60/261,367, filed on Jan. 12, 2001.

(51) Int. Cl.[7] .............................. B32B 9/00; D02G 3/02

(52) U.S. Cl. ........................... 428/37; 428/98; 428/336; 428/698; 428/702; 977/DIG. 1

(58) Field of Search ................................ 428/336, 689, 428/697, 702, 98, 37; 977/DIG. 1

(56) References Cited

U.S. PATENT DOCUMENTS 6,586,095 B2 * 7/2003 Wang et al. ................ 428/397

OTHER PUBLICATIONS

Dai, Pan and Wang; Gallium Oxide Nanoribbons and Nanosheets; pp. 1–14 (no date).
Pan, Dai and Wang; Lead Oxide Nanobelts and Phase Transformation Induced by Electron Beam Irradiation, Aug., 2001; pp. 1–13.
Pan, Dai and Wang; Nanobelts of Semiconducting Oxides; Mar. 9, 2001; pp. 1947–1949.
Ginley and Bright; Transparent Conducting Oxides; Aug., 2000; pp. 15–18.
Coutts, Young and Li; Characterization of Transparent Conducint Oxides; Aug., 2000; Pagse 58–65.
Lewis and Paine; Applications and Processing of Transparent Conducting Oxides; Aug., 2000; pp. 22–26.
Gordon; Criteria for Choosing Transparent Conductors; Aug., 2000; pp. 52–57.
Kawazoe, Yanagi; Ueda, and Hosono; Transparent p–Type Conducting Oxides; Design and Fabrication of p–n Heterojunctions; Aug. 2000; pp. 28–35.

(List continued on next page.)

*Primary Examiner*—Stephen Stein
(74) *Attorney, Agent, or Firm*—Thomas, Kayden, Horstemeyer & Risley, LLP

(57) ABSTRACT

Briefly described, new types of nanostructures and methods of fabrication thereof are disclosed. A representative nanostructure includes a free-standing, helical semiconductor oxide nanostructure. The free-standing, helical semiconductor oxide nanostructure includes a nanobelt having a substantially rectangular cross-section. The the nanobelt is about 5 nanometers to about 200 nanometers in width and about 3 nanometers to about 50 nanometers in height, and the radius of the helical semiconductor oxide nanostructure is about 200 to 5000 nanometers.

17 Claims, 11 Drawing Sheets

OTHER PUBLICATIONS

Minami; New n–Type Transparent Conducting Oxides; Science Magazine Aug. 2000; p. 38–43.
Wang; Semiconducting Oxides Prepared in the Form of Nanobelts; MRS Bulletin Aug., 2001; pp. 603–604.
Kong, et al.; Spontaneous Polarization–Induced Nanohelixes, Nanosprings, and Nanorings of Piezoelectric Nanobelts; Nano Letters 2003, vol. 3, No. 12; pp. 1625–1631.
Kong, et al.; Polar–Surface Dominated ZnO Nanobelts and the Electrostatic Energy Induced Nanohelixes, Nanosprings, and Nanospirals; Applied Physics Letters, vol. 84, No. 6, Feb. 9, 2004; pp 975–977.
Wang, et al.; Induced Growth of Asymmetric Nanocantilever Arrays on Polar Surfaces; Physical Review Letters, vol. 91, No. 18; pp 185502–1–185502–4.

* cited by examiner

SEMICONDUCTING OXIDE NANOSTRUCTURES

CROSS-REFERENCE TO RELATED APPLICATION

This application is a continuation-in-part of and claims priority to copending U.S. utility application entitled, "Semiconducting Oxide Nanostructures," having Ser. No. 10/211,696, filed on Aug. 2, 2002, which is a divisional application of U.S. Pat. No. 6,586,095 entitled "Semiconducting Oxide Nanostructures" having Ser. No. 10/042,868, now U.S. Pat. No. 6,586,095, filed on Jan. 08, 2002, which claimed priority to copending U.S. provisional application entitled, "Semiconductive Oxide Nanobelts" having Ser. No. 60/261,367, filed Jan. 12, 2001, which is entirely incorporated herein by reference.

TECHNICAL FIELD

This disclosure is generally related to nanostructures and, more particularly, is related to semiconductive and piezoelectric oxide nanostructures and fabrication thereof.

BACKGROUND

Binary semiconducting oxides often have distinctive properties and can be used as transparent conducting oxide (TCO) materials and gas sensors. Current studies of semiconducting oxides have been focused on two-dimensional films and zero-dimensional nanoparticles. For example, fluorine-doped tin oxide films are used in architectural glass applications because of their low emissivity for thermal infrared heat. Tin-doped indium oxide (ITO) films can be used for flat panel displays (FPDs) due to their high electrical conductivity and high optical transparency; and zinc oxide can be used as an alternative material for ITO because of its lower cost and easier etchability. Tin oxide nanoparticles can be used as sensor materials for detecting leakage of several inflammable gases owing to their high sensitivity to low gas concentrations.

In contrast, investigations of wire-like semiconducting oxide nanostructures can be difficult due to the unavailability of nanowire structures. Wire-like nanostructures have attracted extensive interest over the past decade due to their great potential for addressing some basic issues about dimensionality and space confined transport phenomena as well as related applications. In geometrical structures, these nanostructures can be classified into two main groups: hollow nanotubes and solid nanowires, which have a common characteristic of cylindrical symmetric cross-sections. Besides nanotubes, many other wire-like nanomaterials, such as carbides, nitrides, compound semiconductors, element semiconductors, and oxide nanowires have been successfully fabricated.

However, the nanostructures discussed above can have a variety of deficiencies. For example, often it is difficult to control the structure and morphology of many nanostructures. Further, many nanostructures are not defect and/or dislocation free. These deficiencies can cause problems such as, for example, uncontrolled properties due to uncontrolled structure and/or morphology, scattering from dislocations in electric transport applications, and degraded optical properties. Thus, a heretofore unaddressed need exists in the industry to address at least the aforementioned deficiencies and/or inadequacies.

SUMMARY

Briefly described, this disclosure provides for new types of nanostructures and methods of fabrication thereof. A representative nanostructure includes a free-standing, helical semiconductor oxide nanostructure. The free-standing, helical semiconductor oxide nanostructure includes a nanobelt having a substantially rectangular cross-section. The the nanobelt is about 5 nanometers to about 200 nanometers in width and about 3 nanometers to about 50 nanometers in height, and the radius of the helical semiconductor oxide nanostructure is about 200 to 5000 nanometers.

Another representative nanostructure includes a free-standing semiconductor oxide nanoring. The nanoring has a radius of about 500 to 10,000 nanometers, a height of about 5 to 2000 nanometers, and a width of about 50 to 7500 nanometers.

This disclosure also involves a method of preparing nanostructures. A representative method includes: providing a homogeneous metal oxide powder mixture; exposing the homogeneous metal oxide powder mixture to thermal conditions of about 900 to 1600° C. at a pressure of about $10^{-3}$ to $10^{-2}$ torr for about 5 to 100 minutes; flowing an inert gas over the homogeneous metal oxide powder mixture; and forming a free-standing semiconductor oxide nanostructure via a condensation reaction at a pressure of about 50 to 800 torr at thermal conditions of about 100 to 700° C., each of the free-standing semiconductor oxide nanostructures having a substantially rectangular cross-section.

Other systems, methods, features, and advantages of this disclosure will be or become apparent to one with skill in the art upon examination of the following drawings and detailed description. It is intended that all such additional systems, methods, features, and advantages be included within this description, be within the scope of this disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of this disclosure. Moreover, in the drawings, like reference numerals designate corresponding parts throughout the several views.

FIG. 6A illustrates a low-magnification transmission electron microscope (TEM) images and the corresponding electron diffraction patterns recorded from the areas as indicated by a sequence number from a TEM grid without tilting, showing their unanimous [0001] orientation on a flat carbon substrate. FIG. 6B illustrates a TEM image and the corresponding electron diffraction pattern, showing that the nanobelt grows along [$2\bar{1}\bar{1}0$] (a-axis), with ±(0001) top and bottom surfaces, and ±(01$\bar{1}$0) side surfaces. FIG. 6C illustrates a high-resolution TEM image recorded from the center of the nanobelt given in FIG. 6B, showing its dislocation-free volume. The inset is the projected model of the wurtzite ZnO along [0001]; the positions of the Zn atoms are in correspondence to the white dots observed in the image. FIG. 6D illustrates a [0001] profile high-resolution TEM image recorded from the edge of the nanobelt given in FIG. 6B, showing the flatness of the surface. FIG. 6E illustrates a low magnification TEM image and the corresponding electron diffraction patterns recorded from the circled regions, displaying the geometry of the nanobelt. The difference between the two electron diffraction patterns is due to the bending in the local regions. The contrast observed in the image is the bending contour in electron imaging produced by the deformation of atomic planes. FIG. 6F illustrates a TEM image showing the helical twist of a nanobelt. The dark contrast at the top is due to the local strain. FIG. 6G illustrates the structure model of the ZnO nanobelt.

FIG. 11A illustrates a TEM image of a ZnO nanoring viewed with the electron beam parallel to the plane of the nanoring, while (a$_1$) illustrates an electron diffraction pattern recorded from area a$_1$ marked in FIG. 11A, (a$_2$) illustrates an enlargement of area a$_2$ marked in (A), showing a loose end at the left-hand side, and (a$_3$) illustrates electron diffraction pattern recorded from the loose end (area a$_3$ marked in a$_2$). FIGS. 11B and 11C illustrate bright-field and dark-field TEM images recorded from the nanoring after tilting about 15°, while (b) illustrates electron diffraction pattern recorded from the area (b) marked in FIG. 11B. FIGS. 11D through 11F illustrate larger images from the areas (d, e, f), respectively, marked in FIG. 11A, after slightly tilting the nanoring. FIG. 11G illustrates an enlarged TEM image of the nanoring tilted about 10°. FIG. 11H illustrates an enlargement of the area h indicated in FIG. 11C, which shows a uniform distribution of stacking faults across the entire width of the nanoring. FIG. 11I illustrates a high-resolution TEM image recorded from the nanoring when the incident electron beam is parallel to the ring-plane, showing stacking faults inside the nanobelt and at the interface between the coiled loops.

FIGS. 12A and 12B illustrate bright-field and dark-field TEM images, respectively, recorded from the nanoring with the incident electron beam parallel to the ring plane. FIG. 12C illustrates an electron diffraction pattern recorded from the nanoring. The pattern shows vertical mirror symmetry, and the extra diffraction spots at the two sides are from the cylindrical bending of the single-crystal ribbon. FIG. 12D illustrates a high-resolution TEM image recorded from the central symmetric line in FIG. 12A. FIGS. 12E and 12F illustrate enlarged TEM images from the areas (e) and (f) marked in FIG. 12A, respectively, showing the coiling layers. FIGS. 12E and 12F illustrate bright-field and dark-field TEM images recorded form the nanoring after tilting about 15°.

DETAILED DESCRIPTION

This disclosure describes free-standing nanostructures and methods of fabrication thereof. In general, the free-standing nanostructures have substantially rectangular cross-sections. Embodiments of the free-standing nanostructure may be defect free, dislocation free, and/or structurally uniform, while the surfaces of the free-standing nanostructure are specific crystallographic planes. In addition, the structure and the morphology of the free-standing nanostructure can be controlled using embodiments of the method of fabrication. In this manner, the free-standing nanostructures and methods of fabrication thereof may overcome some of the deficiencies described above.

Figure 1:
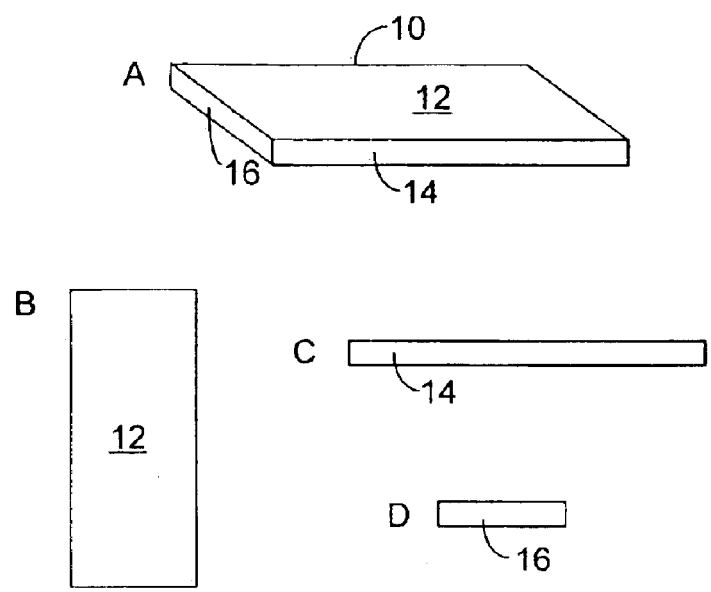
FIG. 1 includes schematics that illustrate a perspective view, a top view, a side view, and, an end view of a nanobelt.
Figure 2:
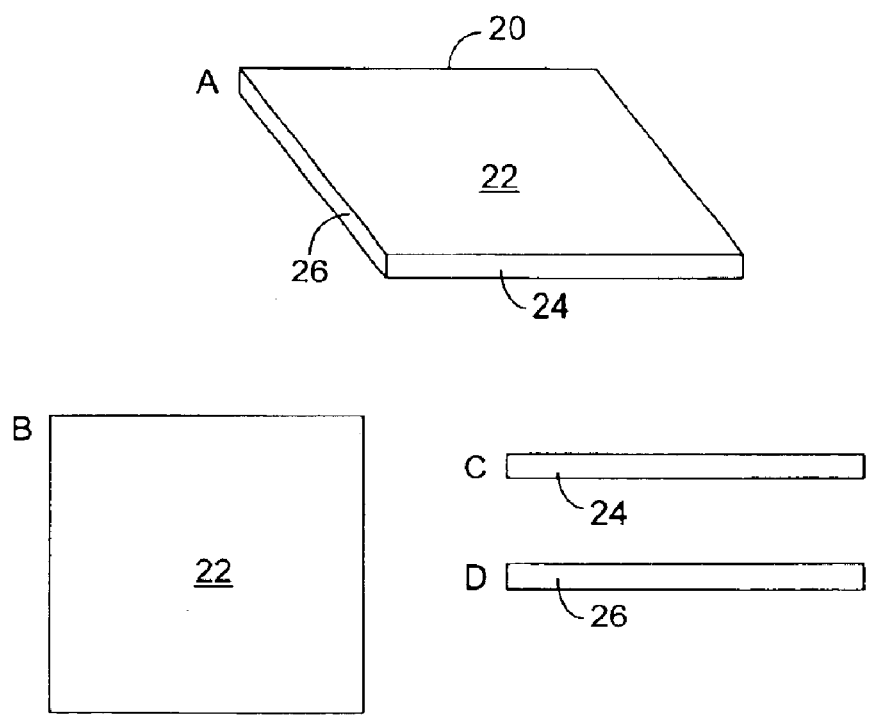
FIG. 2 includes schematics that illustrate a perspective view, a top view, a side view, and, an end view of a nanosheet.

In general, the free-standing nanostructures can be nanobelts, nanosheets, nanodiskettes, helical nanostructrues, or nanorings, that have a substantially rectangular cross-section. FIG. 1 illustrates a perspective view (A), a top view (B), a side view (C), and an end view (D) of a nanobelt 10. The perspective view (A) illustrates a top 12, a side 14, and an end 16 of the nanobelt 10. The top view (B), side view (C), and the end view (D) illustrate the top 12, the side 14, and the end 16 of the nanobelt 10. FIG. 2 illustrates a perspective view (A), a top view (B), a side view (C), and an end view (D) of a nanosheet 20. The perspective view (A) illustrates a top 22, a side 24, and an end 26 of the nanosheet 20. The top view (B), the side view (C), and the end view (D) illustrate the top 22, the side 24, and the end 26 of the nanosheet 20.

Figure 5:
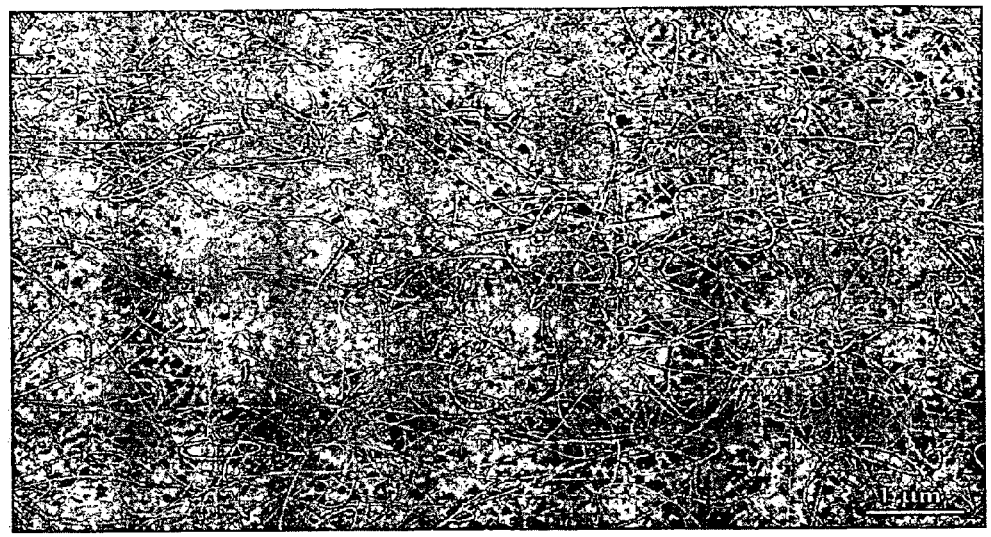
FIG. 5 illustrates scanning electron microscope (SEM) images of the as-synthesized ZnO nanobelts.

Nanobelts 10 can be characterized as "ribbon-like" structures, while the nanosheets 20 can take the form of a variety of polygonal shapes such as, for example, a rectangle, a square, a triangle, etc. Nanodiskettes (not shown) are similar to nanosheets 20 except that nanodiskettes are "coin-shaped" structures. The structure of the helical nanostructure (as shown in FIG. 5 in Example 1B) can be described as a nanobelt configured as helix (e.g., coil or ring structure) having a substantially uniform radius along the length of the helix. The structure of the nanoring (as shown in FIG. 10 in Example 1C) can be described as a plurality of contiguous side-by-side loops of a nanobelt. This disclosure does not describe in any definite dimensions the difference between nanobelts 10, nanosheets 20, and nanodiskettes. For clarity, this disclosure refers to nanobelts, nanosheets, and nanodiskettes as "nanostructures," unless the structure being referred to is specifically denoted as a nanobelt, a nanosheet, a nanodiskette, a helical nanostructure, or a nanoring.

The nanostructures are fabricated of at least one semiconductor oxide and/or at least one doped semiconductor oxide. The semiconductor oxide includes oxides of zinc, cadmium, mercury, gallium, indium, tellurium, germanium, tin, and lead. The nanostructure fabricated of at least one semiconductive oxide can be, for example, a binary or a ternary complex of the semiconductor oxide.

The doped semiconductor oxide includes at least one semiconductive oxide that can be doped with at least one dopant that may be chosen from aluminum, gallium, boron, yttrium, indium, scandium, silicon, germanium, titanium, zirconium, hafnium, antimony, tin, nitrogen, and fluorine. The nanostructure can be fabricated of at least one doped semiconductor oxide, for example, a binary or a ternary complex of the doped semiconductor oxide.

The size (e.g., length, width, and height (thickness)) of the nanostructure can vary within a type of semiconductor oxide and among each of the semiconductor oxides. The size of the nanostructure can be controlled to fit certain criteria for a particular application. However, in general, the nanostructures can be about 20 nanometers to about 6000 nanometers in width, about 5 nanometers to about 100 nanometers in height, and about 100 nanometers to about 3 millimeters in length. The nanostructures can have a width-to-height ratio of about 5 to about 15. In addition to the dimensions described above, the following examples describe illustrative sizes of the nanostructures for some of the semiconductor oxides.

As mentioned above, the helical nanostructure includes a nanobelt having a substantially rectangular cross-section. In addition, the helical nanostructure is a single crystalline structure. The radius of the helical nanostructure is about 200 nanometers to 5000 nanometers, and specifically can be about 400 nanometers to 800 nanometers. The width of the nanobelt is about 5 nanometers to 200 nanometers, and specifically can be about 10 nanometers to 60 nanometers. The height of the nanobelt is about 3 nanometers to about 50 nanometers, and specifically can be about 5 nanometers to 20 nanometers. The nanobelt is about 100 nanometers to 3 millimeters in length.

An exemplary embodiment of the helical nanostructure includes a helical zinc oxide nanostructure that includes a polar surface dominated zinc oxide nanobelt. The zinc oxide nanobelt includes polarized ±(0001) facets and, in particular, the zinc oxide nanobelt includes a top ±(0001) surface, a bottom ±(000$\bar{1}$) surface, a right side (10$\bar{1}$0) surface, and a left side −(10$\bar{1}$0) surface.

As mentioned above, the nanoring includes a nanobelt having a substantially rectangular cross-section. In addition, the nanoring is a single crystalline structure. The structure of the nanoring can be described as a plurality of contiguous side-by-side loops of the nanobelt. The dimensions of the nanobelt are similar to those described above for the helical nanobelt. The nanoring includes about 1 to 250 loops of the nanobelt, and suitably about 10 to 200 loops of the nanobelt. The nanoring has a radius of about 500 nanometers to 10,000 nanometers, and suitably about 600 nanometers to 2000 nanometers. The nanoring has a height of about 5 nanometers to 2000 nanometers, and suitably about 5 nanometers to 30 nanometers. The nanoring has a width of up to about 7500 nanometers, and suitably about 200 nanometers to 1000 nanometers.

An exemplary embodiment of the nanoring includes a polar surface dominated zinc oxide nanobelt. The zinc oxide nanobelt includes polarized ±(0001) facets and, in particular, the zinc oxide nanobelt has an interior (0001)-Zn surface and an exterior ±(000$\bar{1}$)-O surface. The zinc oxide nanobelt includes a top ±(0001) surface, a bottom ±(0001) surface, a right side (1$\bar{2}$10) surface, and a left side −(1$\bar{2}$10) surface.

Figure 3:
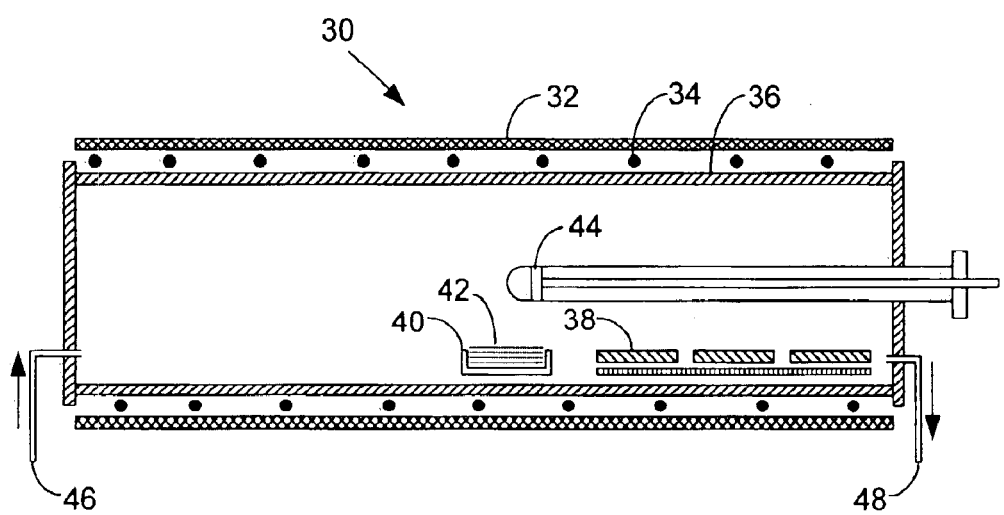
FIG. 3 is a schematic that illustrates an apparatus that can be used to fabricate the nanobelt and/or the nanosheet shown in FIGS. 1 and 2.

In general, the methods for fabricating nanostructures can be based on thermal evaporation of oxide powders under controlled conditions that can be performed on the apparatus 30 shown in FIG. 3. The apparatus 30 includes a horizontal tube furnace 32 that has an alumina tube 36 therein and is wrapped in a heating coil 34. Inside the alumina tube 36 are one or more alumina plates 38 and an alumina crucible 40, which contains the oxide powder 42 and/or other chemicals used to fabricate the nanostructures. To measure the temperature at various locations in the furnace 32, a thermocouple 44 or other temperature measuring device can be moved within the furnace 32. The apparatus 30 is also equipped with input 46 and output tubes 48 to introduce and pump-out a flow gas such as Argon (Ar). Additional features known by one skilled in the art are also included in the apparatus such as vacuum pumps, vacuum manifolds, reactant gas inputs, reactant gas manifolds, etc., and will not be discussed here.

In practice, the desired oxide powder is placed in the aluminum crucible 40 in the center of an alumina tube 36. The temperature, pressure, and evaporation time are controlled. Typically, the evaporation is performed without a catalyst. Except for the evaporation temperature that can be determined based on the melting point of the oxides used, the following parameters are typically kept constant: evaporation time (e.g., 2 hours), alumina tube 36 pressure (e.g., 300 Torr), and flow gas flow rate (e.g., Argon flowed at approximately 50 standard cubic centimeter per minute (sccm)). During evaporation, the products of the evaporation are deposited onto the alumina plates 38 located at the downstream end of the alumina tube 36.

Typically, the as-deposited products can be characterized and analyzed by x-ray diffraction (XRD) (Philips PW 1800 with Cu Kα radiation), scanning electron microscopy (SEM) (Hitachi S800 FEG), transmission electron microscopy (TEM) (Hitachi HF-2000 FEG at 200 kV and JEOL 4000EX high resolution TEM (HRTEM) at 400 kV), and energy dispersive x-ray spectroscopy (EDS).

Figure 4:
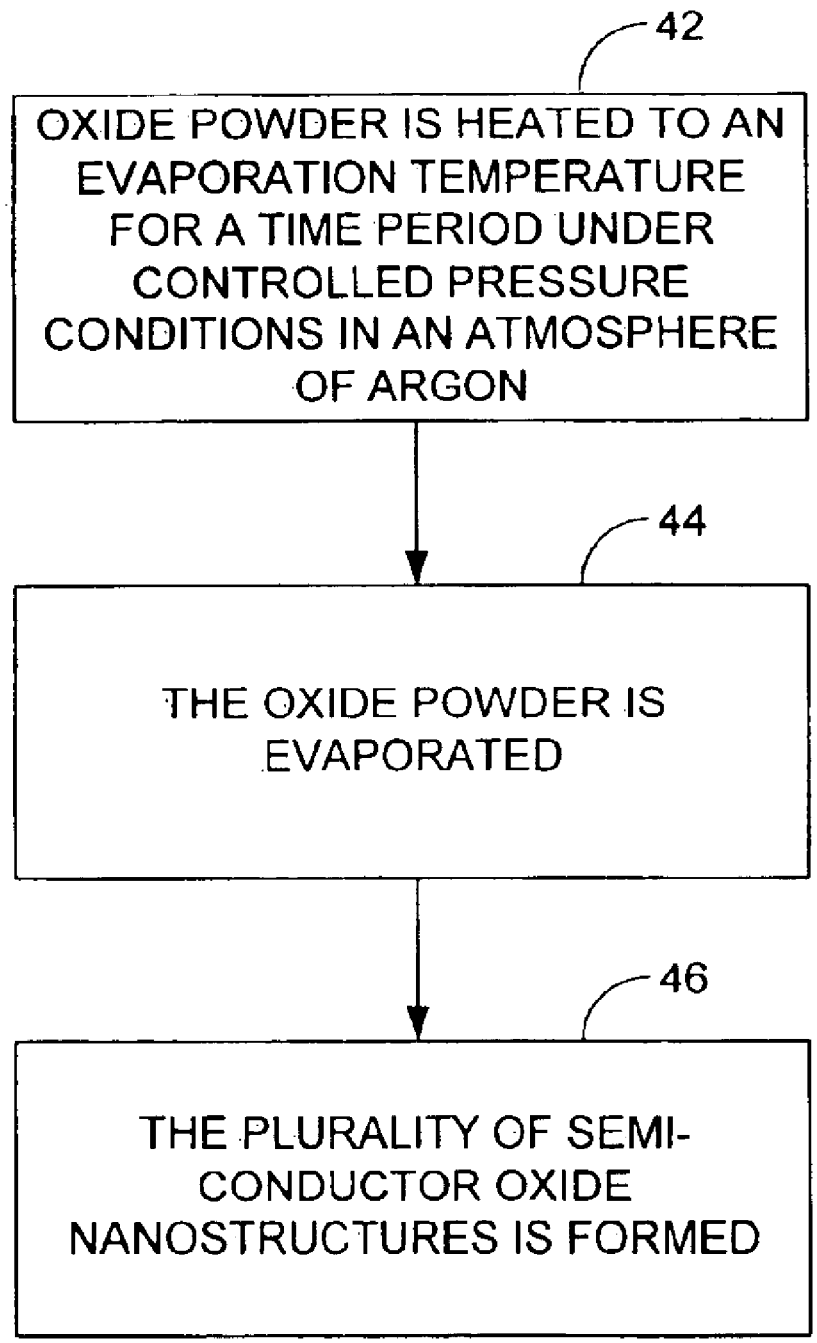
FIG. 4 is a flow diagram illustrating a representative method for fabricating nanostructures as shown in FIGS. 1 and 2.

Reference will now be made to the flow diagram of FIG. 4. FIG. 4 illustrates a representative method of preparing a plurality of semiconductor oxide nanostructures having a substantially rectangular cross-section from an oxide powder. Initially, the oxide powder is heated to an evaporation temperature of the oxide powder for about 1 hour to about 3 hours at about 200 torr to about 400 torr in an atmosphere comprising an inert gas such as Argon, as shown in block 42. Then, the oxide powder is evaporated, as shown in block 44. Thereafter, the plurality of semiconductor oxide nanostructures is formed, as shown in block 46.

In regard to helical nanostructures and nanorings, the following describes a representative method for preparing helical nanostructures and nanorings. Additional details for the method are described in reference to Examples 1B and 1C. Initially, a metal oxide powder (e.g., zinc oxide with a small amount of lithium oxide, indium oxide, and/or lithium carbonate) is exposed to thermal conditions of about 900 to 1600° C. (in particular, about 1350 to 1400° C.) at a pressure of about 50 to 800 torr for about 5 to 100 minutes (in particular, about 30 minutes). After the metal oxide powder is heated at a pressure of about $10^{-3}$ to $10^{-2}$ torr, an inert gas, such as Argon, is flowed (e.g., about 25 to 50 standard cubic centimeters per second) over the decomposing and evapoating metal oxide powder. Subsequently, free-standing semiconductor oxide nanostructures (e.g., helical nanostructures and nanorings) are formed via a condensation reaction at a pressure of about 50 to 800 torr (particularly, about 250 to 500 torr) at thermal conditions of about 100 to 700° C. (particularly, about 200 to 500° C.). The processing conditions can be adjusted to control the amount of each type of nanostructure formed as described below in Examples 1B and 1C.

Having summarized the nanostructures and methods of fabrication thereof above, reference will now be made in detail to six illustrative examples of the semiconductor oxide nanostructures. While the invention is described in connection with these examples, there is no intent to limit the invention to the following examples. On the contrary, the intent is to cover all alternatives, modifications, and equivalents included within the spirit and scope of the invention.

Examples 1–4 are discussed in the following papers entitled "Nanobelts of Semiconducting Oxides," published in *Science* Vol. 291, 9, March 2001, "Spontaneous polarization induced nanohelicals, nanosprings, and nanorings of piezoelectric nanoblets," (*Nano Letters*, December 2003), and "Single-crystal cylindrical nanorings formed by epitaxial self-coiling of polar-nanoblets," (*Science*, in review), which are herein incorporated by reference. Example 5 is discussed in the paper entitled "Gallium Oxide Nanoribbons and Nanosheets," and is in-press at the *Journal of Physical Chemistry B*, which is herein incorporated by reference. Example 6 is discussed in the paper entitled "Lead Oxide Nanobelts and Phase Transformation Induced by Electron Beam Irradiation," and is in-press at *Applied Physics Letters*, which is herein incorporated by reference.

EXAMPLE 1A

Zinc Oxide

Thermal evaporation of zinc oxide (ZnO) powders (purity: 99.99%, melting point: 1975° C.) at 1400° C. for approximately 2 hours resulted in white wool-like products that formed in high yield on the surface of the alumina plate 38. Scanning electron microscopy (SEM) observations reveal that the products consist of a large quantity of nanostructures with typical lengths in the range of several tens to several hundreds of micrometers, while some of nanostructures have lengths on the order of millimeters. EDS microanalysis and powder XRD measurement show that the sample is wurtzite (hexagonal) structured ZnO with lattice constants of a=3.249 Å and c=5.206 Å, consistent with the standard values for bulk ZnO.

TEM images reveal that the ZnO nanostructure has a substantially rectangular cross-section (i.e., nanobelt) that is distinct in cross-section from nanotubes and nanowires. Each nanobelt has a uniform width along a substantial portion of the length of the nanobelt, and the typical widths of the nanobelts are in the range of 50 to 300 nanometers. In addition, the ends of the nanobelts do not include a particle. The typical height and width-to-height ratios of the ZnO nanobelts are in the range of 10 to 30 nanometers and about 5 to about 10, respectively. HRTEM and electron diffraction show that the ZnO nanobelts are structurally uniform and single crystalline but with two different growth directions. The nanobelt, growing along [0001] and enclosed by $\pm(2\bar{1}\bar{1}0)$ and $\pm(01\bar{1}0)$ facets, shows no defect and dislocations. The nanobelt, growing along [$01\bar{1}0$] and enclosed by $\pm(0001)$ and $\pm(2\bar{1}\bar{1}0)$ facets, is also dislocation free but with only a single stacking fault that is parallel to the axis and runs throughout the entire length of the nanobelt. The surfaces of these nanobelts are clean, atomically sharp, and without any sheathed amorphous phase.

EXAMPLE 1B

Zinc Oxide

Zinc oxide (ZnO) is a versatile "smart" material that has applications in catalysts, sensors, piezoelectric transducers, transparent conductor, and surface acoustic wave devices. The non-central symmetry and the tetrahedrally coordinated $ZnO_4$ unit in ZnO result in anisotropic piezoelectric properties. Structurally, the wurtzite structured ZnO crystal is described schematically as a number of alternating planes composed of fourfold coordinated $O^{2-}$ and $Zn^{2+}$ ions, stacked alternatively along the c-axis. The oppositely charged ions produce positively charged (0001)-Zn and negatively charged ($000\bar{1}$)-O polar surfaces, resulting in a normal dipole moment and spontaneous polarization, as well as a divergence in surface energy. To maintain a stable structure, the polar surfaces generally have facets or exhibit massive surface reconstructions, but ZnO $\pm(0001)$ is an exception, which is atomically flat, stable, and without reconstruction.

Nanowire and nanotube based materials have been demonstrated as building blocks for nanocircuits, nanosystems, and nano-optoelectronics and they have been fabricated for a wide range of materials including, for example, metals, semiconductors, oxides, and polymers. A variety of quasi-one-dimensional ZnO nanostructures, such as nanowires and nanobelts, have been synthesized, and they have been used for fabricating nano-scale lasers, field effect transistors, gas sensors, cantilevers, and resonators. But these ZnO nanostructures grow along the c-axis and the side surfaces are $\{01\bar{1}0\}$ and $\{2\bar{1}\bar{1}0\}$, due to their lower energies than that of (0001), resulting in vanishing dipole moment and much reduced piezoelectricity. The most desirable morphology to maximize the piezoelectric effect is to create nanostructures that preserve large area (0001) polar surfaces. However, ZnO (0001) has a surface energy that diverges with sample size due to the surface polarization charge. Therefore, growth of (0001) surface dominated freestanding nanostructures needs to overcome the barrier of surface energy.

As described in this disclosure, it was found that the freestanding ZnO nanobelts that grow along the a-axis and their large top and bottom surfaces are the polar (0001) facets. Due to the small thickness of the nanobelts, spontaneous polarization normal to the nanobelt leads to the growth of helical nanostructures. The mechanism for the helical growth is attributed to a consequence of minimizing the total energy contributed by spontaneous polarization and elasticity. The ZnO nanostructures have potential applications as nano-scale sensors, resonators, and transducers that can serve as functional components to be integrated in micro- and nano-electromechanical systems (MEMS, NEMS). They are also ideal systems for understanding piezoelectric effect and spontaneous polarization induced ferroelectric effect at nano-scale.

The structurally controlled, high purity, and high yield ZnO nanobelts were synthesized by a solid-vapor process. A homogeneous mixture of zinc oxide powder (purity 99.99%, melting point 1975° C.) and 1 weight % of lithium oxide (or indium oxide) were placed at the highest temperature zone of a horizontal tube furnace. Before heating to the desired temperature of about 1420° C. (1360° C. when using indium oxide), the tube furnace was evacuated to about $10^{-2}$ torr to remove the residual oxygen. Then the source materials were heated to about 1420° C. at a heating rate of about 20° C./min. ZnO decomposes into $Zn^{2+}$ and $O^{2-}$ at high temperatures (about 1350° C.) and low pressures (about $10^{-3}$ torr). This decomposition process can be used to control the anisotropic growth of the nanobelts. After a few minutes of evaporation and decomposition, the Ar carrier gas was introduced at a flux of about 25 sccm (standard cubic centimeters per minute) which kept the pressure at about 200 torr. The synthesis process was conducted at about 1350° C. for about 30 minutes. The nanobelts were deposited onto an alumina substrate placed in a temperature zone of about 400 to 500° C. under Ar pressure of about 200 torr. Structures of the ZnO nanobelts were analyzed by scanning electron microscopy (SEM) and high-resolution transmission electron microscopy (HRTEM).

SEM and TEM analysis shows that the as-prepared product has a belt-shape with widths of about 10 to 60 nanometers (nm), thickness of about 5 to 20 nm and lengths up to about several hundred micrometers. The dominant component of the as-synthesized sample is nanobelts with a uniform size distribution, but a significant amount of nanobelts have a ring shape (nanorings) (as indicated by arrowheads in FIG. 5), which has not been found for single-crystal nanobelts or nanowires of any other materials.

Figures 6A, 6B, 6C, 6D, 6E, 6F, 6G:
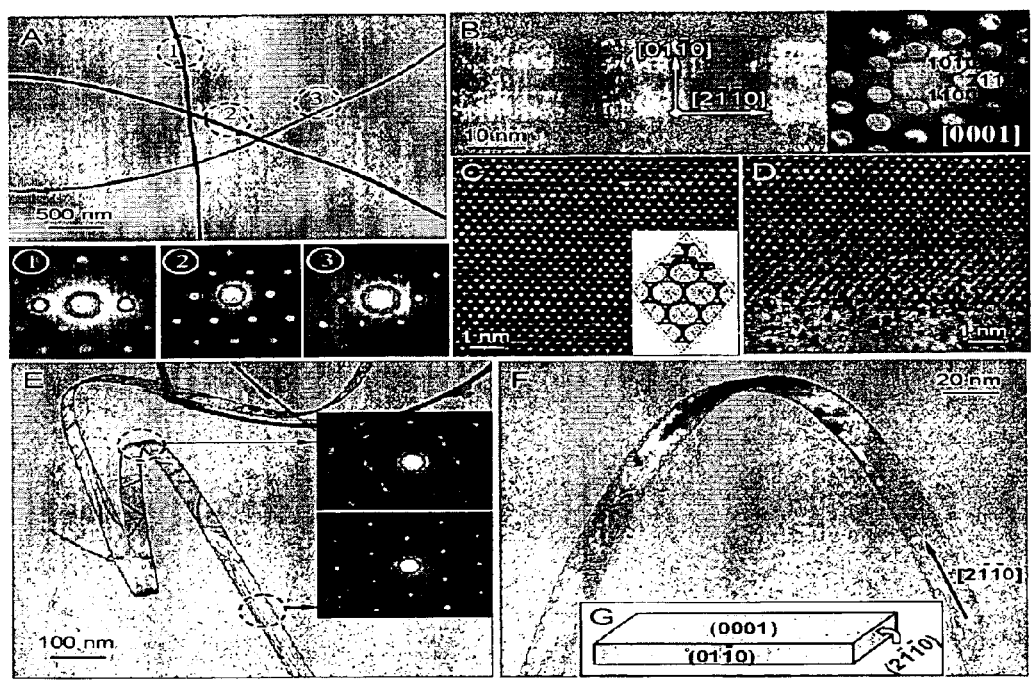
FIGS. 6A through 6G illustrate the controlled growth of (0001) polar surface dominated ZnO nanobelts.
Figures 7A, 7B, 7C, 7D:
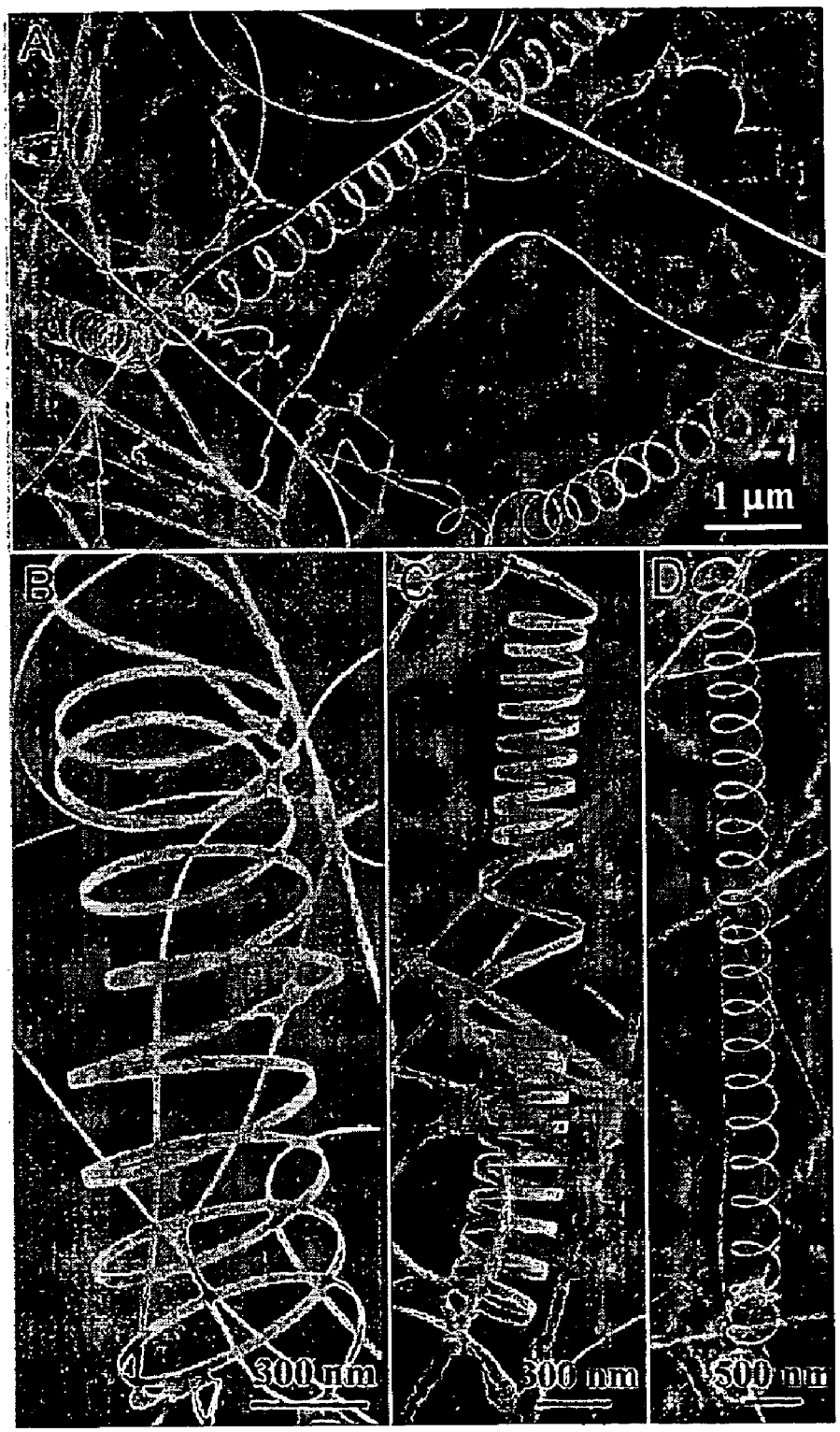
FIGS. 7A through 7D illustrate SEM images of the as-synthesized ZnO nanobelts, showing helical nanostructure.

The ZnO nanobelt has a controlled structure. By examining over a hundred of nanobelts laid down naturally onto a carbon film by electron diffraction (ED), more than 90% of them demonstrated the same orientation of [0001] with respect to the incident electron beam (FIG. 6A), indicating that the top flat surfaces of the nanobelts are the polar ±(0001) facets. This clearly demonstrates the success of overcoming the surface energy barrier by growth kinetics in order to achieve structural control. The ZnO nanobelt has a wurtzite structure with lattice constants of a=0.325 nm and c=0.521 nm. Indexing of the ED pattern shows that the nanobelt grows along $[2\bar{1}\bar{1}0]$ (the a-axis), with its top/bottom surface ±(0001) and the side surfaces ±(01$\bar{1}$0) (FIG. 6B). HRTEM shows that the nanobelt is single crystalline without the presence of dislocations (FIG. 6C), and its geometrical shape is uniform. The surfaces of the nanobelt are clean, atomically sharp and flat (FIG. 6D). Due to the small thickness of about 5 to 20 nm and large aspect ratio of about 1:4, the flexibility and toughness of the nanobelts are both extremely high so that they can be bent or twisted without fracture (FIGS. 6E and 6F). The crystallographic structural model of an exemplary nanobelt is illustrated in FIG. 6G.

Figures 8A, 8B, 8C, 8D, 8E:
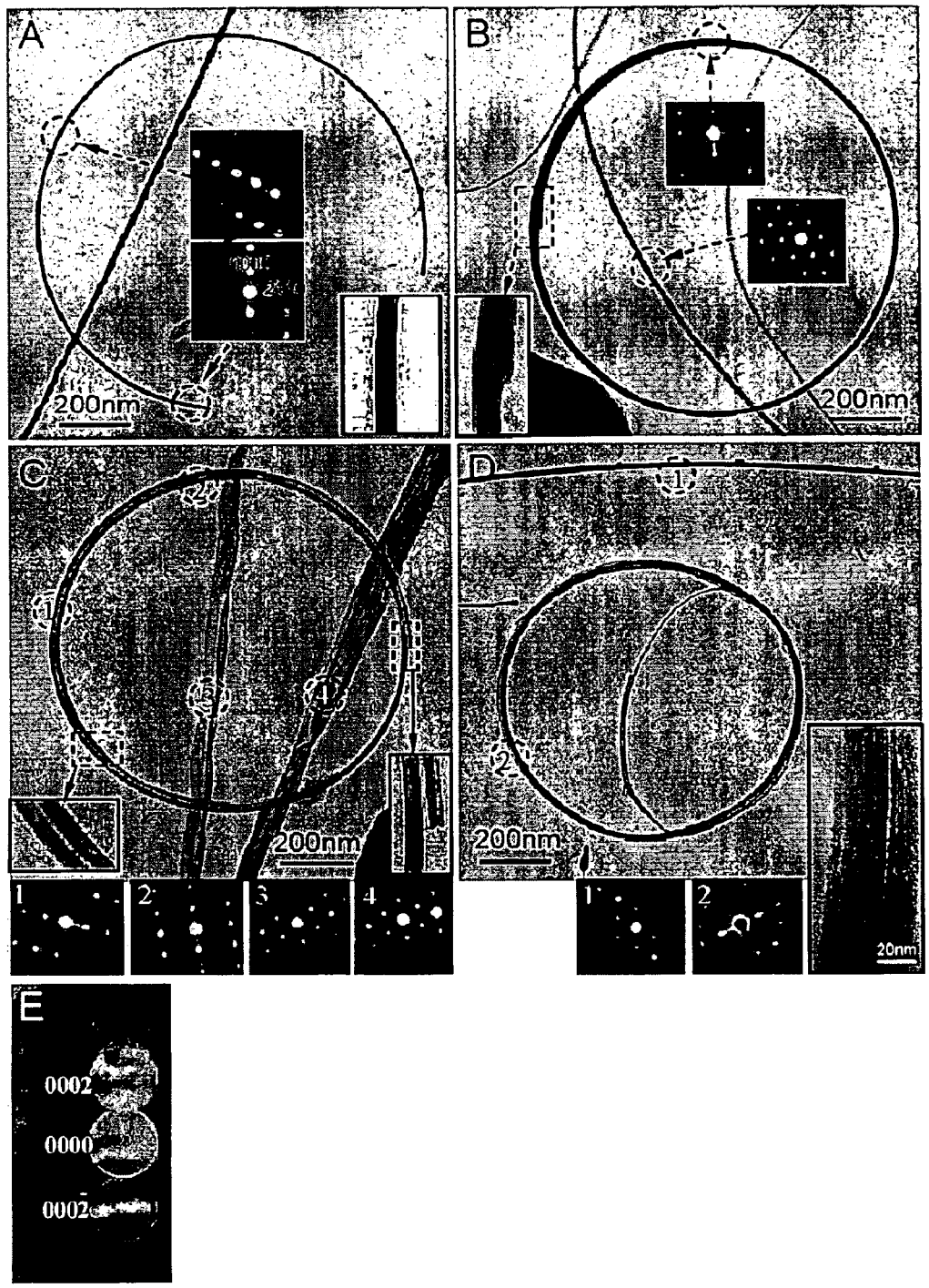
FIGS. 8A through 8E illustrate TEM images and the corresponding electron diffraction patterns recorded from the regions marked in the figure from an incomplete ring, a single-looped ring, double-looped ring, and multiple-looped ring, respectively, without tilting the specimen. Enlarged images from the nanobelts are inserted, from which the number of loops and the contact between the nanobelts can be directly imaged. Electron diffraction patterns recorded from the nanorings unanimously prove that the normal direction of the circular ring plane is [01$\bar{1}$0], and the [0001] c-axis is pointing to the ring center and it rotates following the arc of the ring. Electron diffraction patterns recorded from the straight nanobelts or substantially straight nanobelts are [0001] pattern. FIG. E illustrates convergent beam electron diffraction from a nanobelt, showing the polarity of the nanobelt as evidenced by the asymmetric intensity distribution in the (0002) and (000$\bar{2}$) disks. The result shows that the interior of the nanoring is positive charged and the exterior is negatively charged.

Besides a significant portion of nanorings observed in FIG. 5, the most striking feature of the sample is the formation of helical structures by rolling up single crystalline nanobelts (FIGS. 7A through 7D). The helical nanostructure has a uniform shape with radii of about 500 to 800 nm and evenly distributed pitches. A nearly perfect circular arc is formed by a single nanobelt (FIG. 8A). Electron diffraction indicates that the direction of the radius toward the center of the ring is always [0001] along the entire perimeter without significant twisting, and the circular plane of the nanoring is [01$\bar{1}$0]. A full circular ring formed by a closed nanobelt shows a consistent orientation (FIG. 8B); the orientation of the straight or nearly straight nanobelts are along [0001], consistent with the result from FIG. 6A. The orientation relationship illustrated in FIG. 8A is preserved for nanorings formed by double-looped FIG. 8C and multiple-looped FIG. 8D rolling of a nanobelt. The orientation of the two wider nanobelts across the nanoring in FIG. 8C is [0001]. The enlarged images from the double-looped ring in FIG. 8C clearly indicate that the two loops of the nanobelt are in physical contact and there is even a small gap (about 1 to 2 nm, see the insets in FIG. 8C) between them, suggesting that the interaction between the loops is weak and there is no chemical bonding. Overlap among the loops is possible for multiple-looped ring (see the inset in (FIG. 8D).

The (0001) plane can be terminated with Zn [(0001)-Zn] or oxygen [(000$\bar{1}$)-O], resulting in positively and negatively charged top and bottom surfaces, respectively. Convergent beam electron diffraction has been applied to determine the polarity (FIG. 8E), and the result indicates that the interior surface of the ring is (0001)-Zn and the exterior surface is (000$\bar{1}$)-O. Physically, if the surface charges are uncompensated during the growth, the net dipole moment tends to diverge and the electrostatic energy increases. For a thin nanobelt laying on a substrate, the spontaneous polarization induces electrostatic energy due to the dipole moment, but rolling up to form a circular ring would minimize or neutralize the overall dipole moment, reducing the electrostatic energy. On the other hand, bending of the nanobelt produces elastic energy. The stable shape of the nanobelt is determined by the minimization of the total energy contributed by spontaneous polarization and elasticity.

Figures 9A, 9B, 9C, 9D, 9E, 9F:
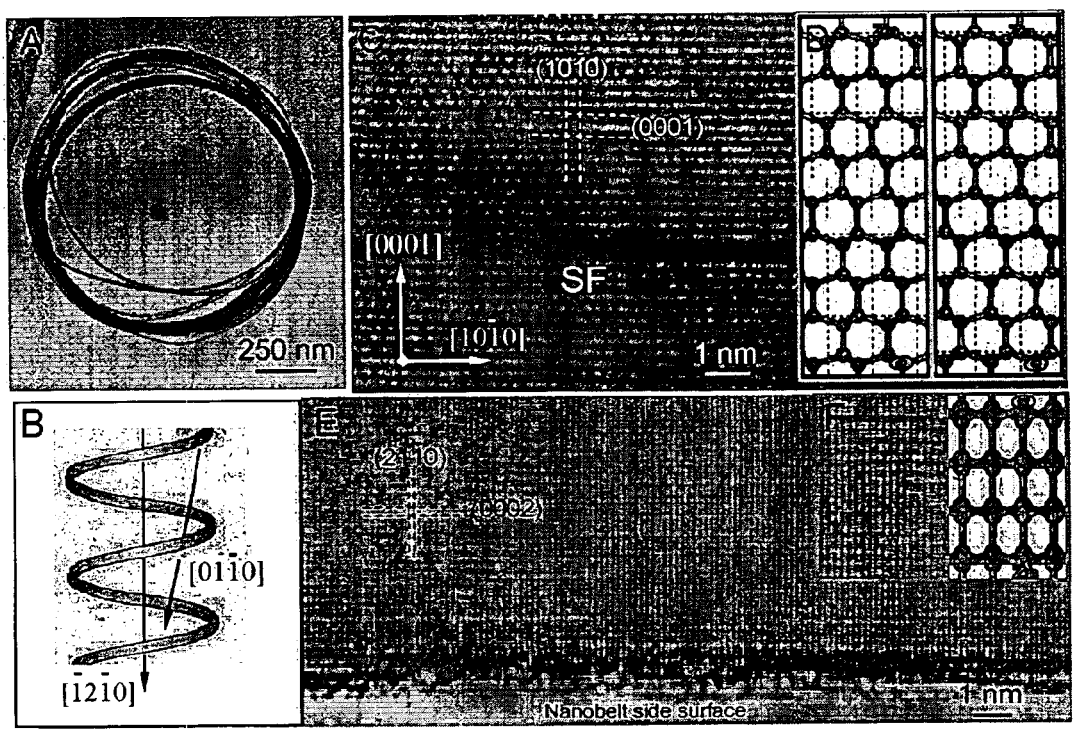
FIG. 9A illustrates a TEM image of a helical nanostructure formed by multiple-loop rolling up of a nanobelt.
FIG. 9B illustrates a schematic model showing the relative orientation for recording high-resolution TEM images along the axial direction of the helical nanostructure ([$\bar{1}2\bar{1}0$]), and the [01$\bar{1}$0] perpendicular to the nanobelt and parallel to its polar surface.
FIG. 9C illustrates a [$\bar{1}2\bar{1}0$] high-resolution TEM image of a nanobelt showing the dislocation-free volume but with the presence of stacking faults (SFs).
FIG. 9D illustrates two possible atomic models in correspondence to the HRTEM image given in FIG. 9C, showing that stacking fault has no effect on the polarity of the nanobelt.
FIG. 9E illustrates a [01$\bar{1}$0] high-resolution TEM image of a nanobelt and the profile of its side surface, showing dislocation-free volume.
FIG. 9F illustrates an enlargement of the image given in FIG. 9E and the projected atomic structure model.

The atomic structure of the nanobelt has been investigated by HRTEM. The model for the helical nanostructure shown in FIG. 9A is given in FIG. 9B. Two orientations have been selected to investigate the atomic structure of the helical nanostructure. The first orientation is along the axis of the helical nanostructure, which is $[\bar{1}2\bar{1}0]$, and the second orientation [01$\bar{1}$0] is parallel to the top (0001) surface and perpendicular to the side surface of the nanobelt. The HRTEM image recorded along $[\bar{1}2\bar{1}0]$ shows clearly the (10$\bar{1}$0) (d=0.28 nm) and (0002) (d=0.26 nm) fringes without the presence of dislocation, but stacking faults parallel to the (0001) plane are identified. The stacking fault is extrinsic with insertion of an extra Zn—O layer parallel to the basal plane. It should be noted that the presence of (0001) stacking faults does not affect the polarity of ZnO, as shown by the models in FIG. 9D. The HRTEM image recorded along [01$\bar{1}$0] clearly presents the (0002) (d=0.26 nm) and (2$\bar{1}\bar{1}$0) (d=0.16 nm) fringes (FIG. 9E). An enlarged image and the projected atomic structural model are shown in FIG. 9F, which also preserves the polarity. The top surface of the nanobelt is flat with the presence of a few atom-height steps as displayed by the profile image in FIG. 9E.

The growth of polar facets dominated nanobelt surfaces is a major step towards development of piezoelectric and ferroelectric one-dimensional nanostructures. Since the ZnO ($2\bar{1}\bar{1}0$) plane has a surface energy lower than that of either (0001) or ($01\bar{1}0$), a fast growth along [$2\bar{1}\bar{1}0$] (a-axis) to form a nanobelt structure may be unfavorable from the energy point of view. But the success of controlled growth of free-standing (0001) polar surface dominated nanobelts along the a-axis demonstrates the experimental feasibility of overcoming the energy barrier through growth kinetics, thus, providing a feasible approach for growing structurally controlled nanobelts of technological importance.

Helical structure is the most fundamental structural configuration for DNA and many biological proteins, which is due to van der Waals forces and hydrogen bonding. For one-dimensional nanostructures, nanocoils, and nanorings have been observed for carbon nanotubes and SiC, the former are created due to a periodic arrangement of the paired pentagon and heptagon carbon rings in the hexagonal carbon network, and the latter are due to a stacking of platelets around the growth axis. These helical structures are produced by the presence of point or planar defects (twins and stacking faults). A difference for the helical nanostructures for single crystalline ZnO nanobelt described here is that they are the spontaneous polarization induced structures. The nanobelts and helical nanostructures are an ideal system for understanding piezoelectricity and polarization induced ferroelectricity at nano-scale.

EXAMPLE 1C

Zinc Oxide

Self-assembly is a fundamental approach for organizing and constructing hierarchical structures using nano-building-blocks through substrate patterning and surface functionalization. Self-assembly of nanocrystals is driven by van der Walls forces and hydrogen bonding among the passivating organic molecules on the particle surfaces. Polar-charge induced self-assembly is frequently observed for chain molecules in a solution environment: a local spontaneous ordering of molecular polarity and chirality resulting in the formation of stripes; and chiral domains of achiral molecules and ferroelectric liquid crystals being polarization-induced self-assembly. For crystalline nanomaterials grown in a solid-vapor environment, one type of polar-charge induced helical and spiral structures of ZnO has been done (see Example 1B). In this example, a distinct and unique nanoring structure that is formed by spontaneous self-coiling of a polar nanobelt during growth is described. Although not intending to be bound by theory, the nanoring is suggested to be initiated by circularly folding a nanobelt due to long-range electrostatic interaction, and the short-range chemical bonding among the loops leads to a single-crystalline structure. The self-coiling is driven by minimizing the energy contributed by polar charges, surface area, and elastic deformation.

The single-crystal nanorings of ZnO were grown at a high reproducibility by a solid-vapor process. A homogeneous mixture of ZnO powder (melting point 1975° C.) and indium oxide and lithium carbonate at about a 20:1:1 ratio were positioned at the highest temperature zone of a horizontal tube furnace. Before heating to a desired temperature of about 1400° C., the tube furnace was evacuated to about $10^{-3}$ torr to remove the residual oxygen. The source materials were then heated to about 1400° C. at a heating rate of about 20° C./min. ZnO decomposes into $Zn^{2+}$ and $O^{2-}$ at high temperature (about 1400° C.) and low pressure (about $10^{-3}$ torr), and this decomposition process can be used to control the anisotropic growth of the nanobelts. After a few minutes of evaporation and decomposition, the Ar carrier gas was introduced at a flux of about 50 sccm to maintain the pressure at about 500 torr for about 30 minutes. The synthesis process was conducted at about 1400° C. for about 30 minutes. The condensation products were deposited onto a silicon substrate placed in a temperature zone of about 200 to 400° C. under Ar pressure of about 500 torr. The as-synthesized samples were analyzed by SEM and HRTEM.

Figures 10A, 10B, 10C, 10D:
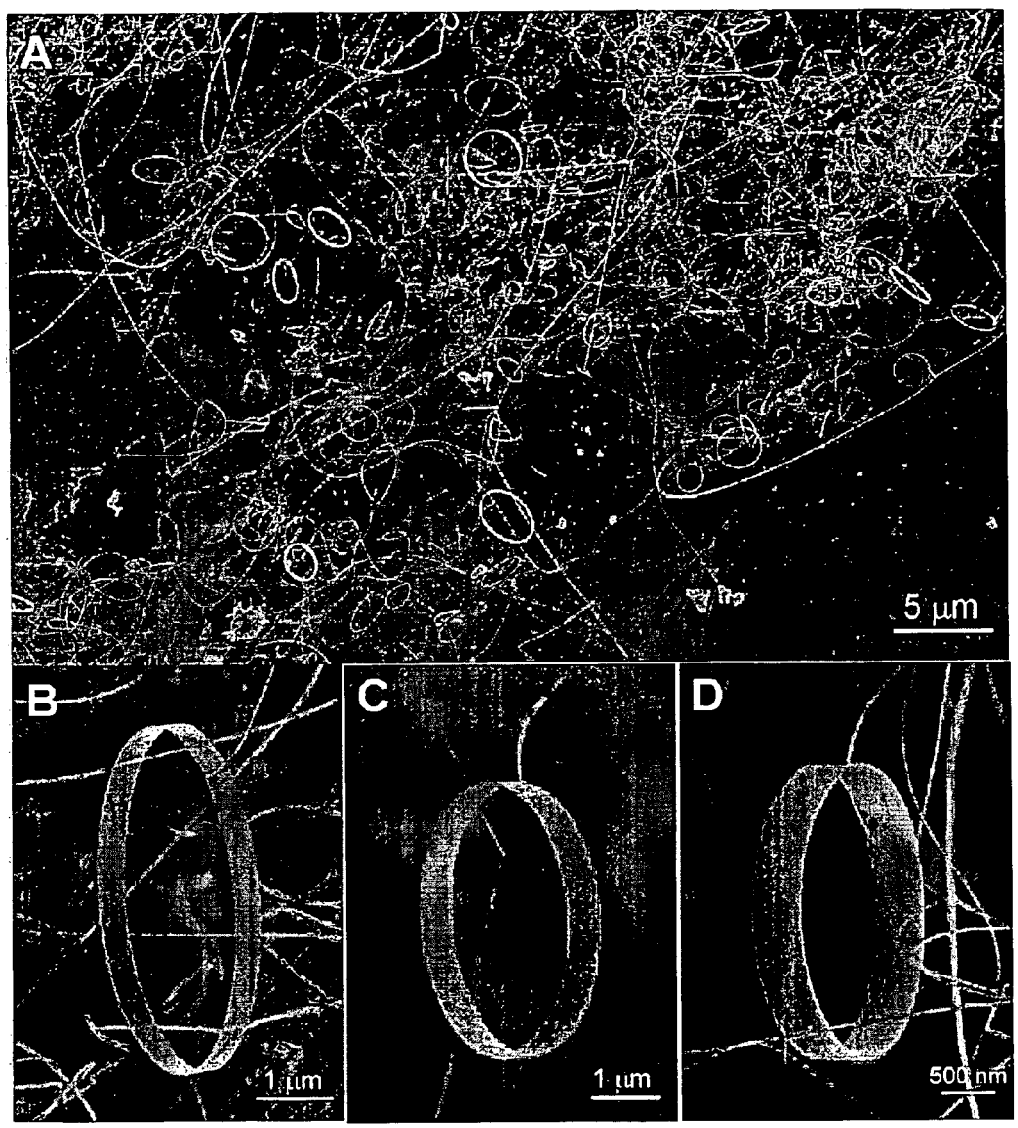
FIG. 10A illustrates a low-magnification SEM image of the as-synthesized ZnO nanorings.
FIGS. 10B through 10D illustrate high-magnification SEM images of freestanding, single-crystal ZnO nanorings, showing substantially uniform geometrical shapes.

The as-synthesized sample is composed of a plurality of freestanding nanorings at a percentage of about 20 to 40% (FIG. 10A), with typical diameters about 1 to 4 µm, thin and wide shells of thicknesses about 10 to 30 nm. SEM images recorded at high-magnification illustrate the perfect circular shape of the complete rings, with uniform shape and flat surfaces (FIGS. 10B through 10D). Energy dispersive X-ray spectroscopy analysis indicates that the nanorings are ZnO.

Figures 11A, 11B, 11C, 11D, 11E, 11F, 11G, 11H, 11I:
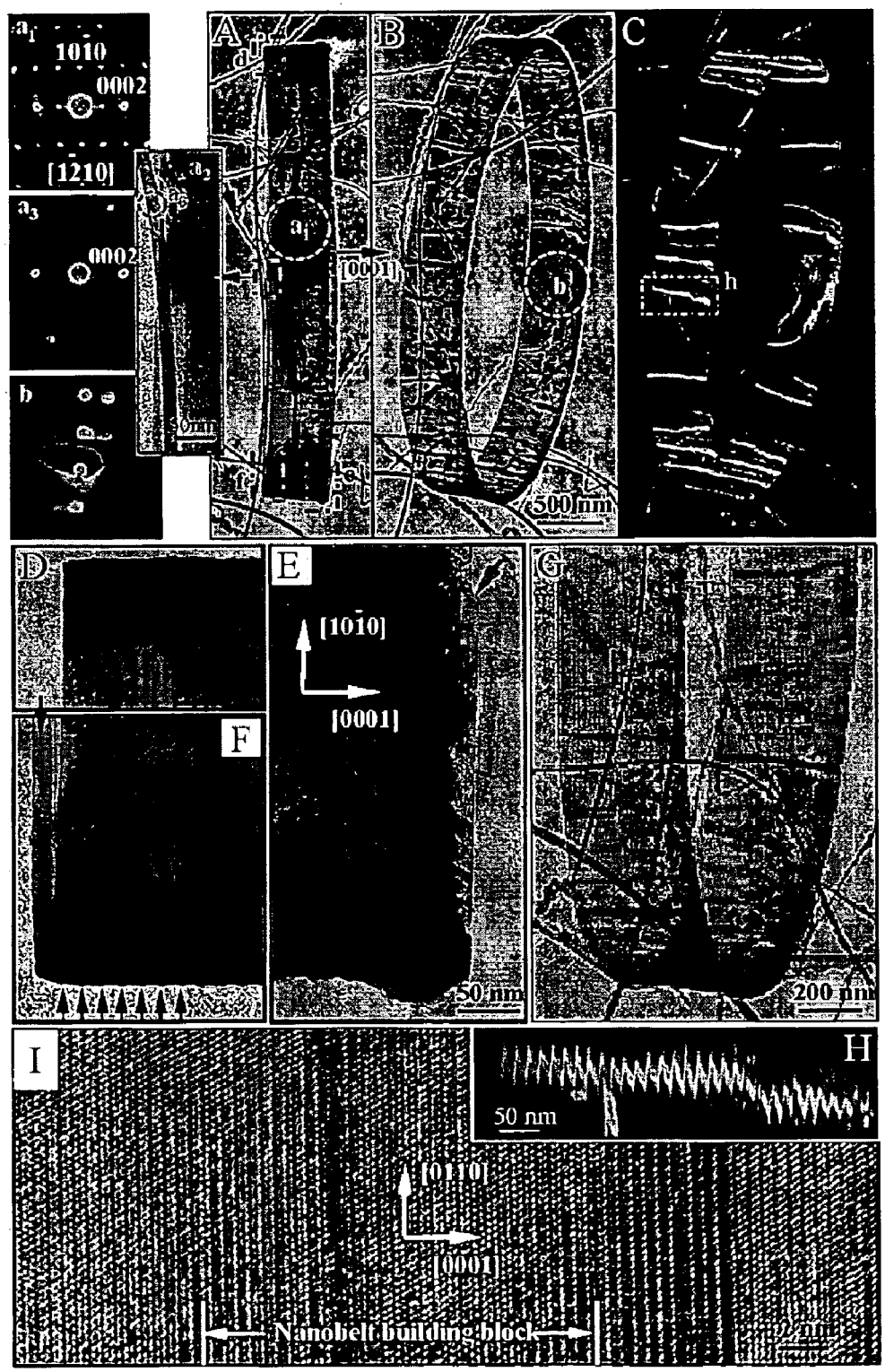
FIGS. 11A through 11I illustrate the structure of the type I ZnO single-crystal nanoring.

Two types of nanoring structures have been found. The type I structure is illustrated in FIG. 11A through 11I. TEM image (FIG. 11A) indicates that the nanoring is a single-crystal entity with nearly perfect circular shape, although there is diffraction contrast due to non-uniform deformation along the circumference. The single-crystal structure referred here means a complete nanoring that is made of a single crystalline ribbon bent evenly at the curvature of the nanoring. Tilting the nanoring for about 20° clearly illustratess the single-crystal circular shape (FIG. 11B). The corresponding dark-field TEM image (FIG. 11C) shows the contrast produced by the equal bending lines across the width of the nanoring (FIG. 11C), which is due to the tilting of the atomic plane with respect to the electron beam. Deformation in the nanometer-thickness ribbon does not need to introduce dislocations. An electron diffraction pattern recorded from the center of the nanoring (area $a_1$ indicated in FIG. 11A) shows that the radial direction of the nanoring is [$1\bar{2}10$], tangential direction [$10\bar{1}0$] and nanoring axis [0001] (the model for these planes and directions are given in FIG. 13A). High-magnification TEM image recorded from the three corners of the image presented in FIG. 11A (areas d, e and f) are shown in FIGS. 11D through 11F, respectively, which clearly illustrate the distribution of the equally spaced stacking faults nearly parallel to the nanoring plane. The stacking faults align from the top of the nanoring to the bottom without interruption (FIGS. 11D and 11F). The trace of the coiling nanobelt is best illustrated through the side of the nanoring, as indicated by arrowheads in FIG. 11F. The entire nanoring is a single crystal, although the quality of the crystallinity varies slightly across the width of the nanoring, as presented by the enlarged TEM image in FIG. 11G.

The nanoring is made of co-axial, uni-radius, and epitaxial-coiling of a nanobelt. By carefully examining the image given in FIG. 11A, a loose end of the raveling nanobelt is found, as indicated by a red arrowhead. The coiling of this nanobelt to form the nanoring is presented by the enlarged image in FIG. 11F, as marked by an arrowhead at the top. Examination of the other side of the nanoring found the other loose end of the nanobelt (as indicated by an arrowhead in FIG. 11E). Electron diffraction pattern recorded from the loose end of the nanobelt, as circled in the enlarged area $a_3$, indicates that the nanobelt has a growth direction of [$10\bar{1}0$], side surfaces ±($1\bar{2}10$), and top/bottom surfaces ±(0001). It is apparent that the nanoring is made of coiling loops of the nanobelt, as in a child's "slinky" spring, by interfacing its (0001)-Zn and ($000\bar{1}$)-O planes at the same crystallographic orientation. The coiling of the nanobelt introduces a small helical angle of about 0.3°; this small rotation is hardly detectable by the electron diffraction pattern.

The loose end of the nanobelt in FIG. 11F has a stacking fault at close to the middle of its width, suggesting that the planar defect was produced during the nanobelt growth and it is the key for leading to the fastest growth of the nanobelt along its axial direction. The total number of coiling loops can be counted from the dark-field TEM image displayed in FIG. 11H as being 33. High-resolution TEM indicates that, besides the stacking fault inside the nanobelt, a stacking fault of a different type is formed at the interface between the adjacent loops, which is introduced to match the lattices of the Zn-terminated and the oxygen-terminated (0001) polar surfaces. The interface between the loops is coherent, epitaxial, and chemically bonded (FIG. 11I).

Figures 12A, 12B, 12C, 12D, 12E, 12F, 12G, 12H:
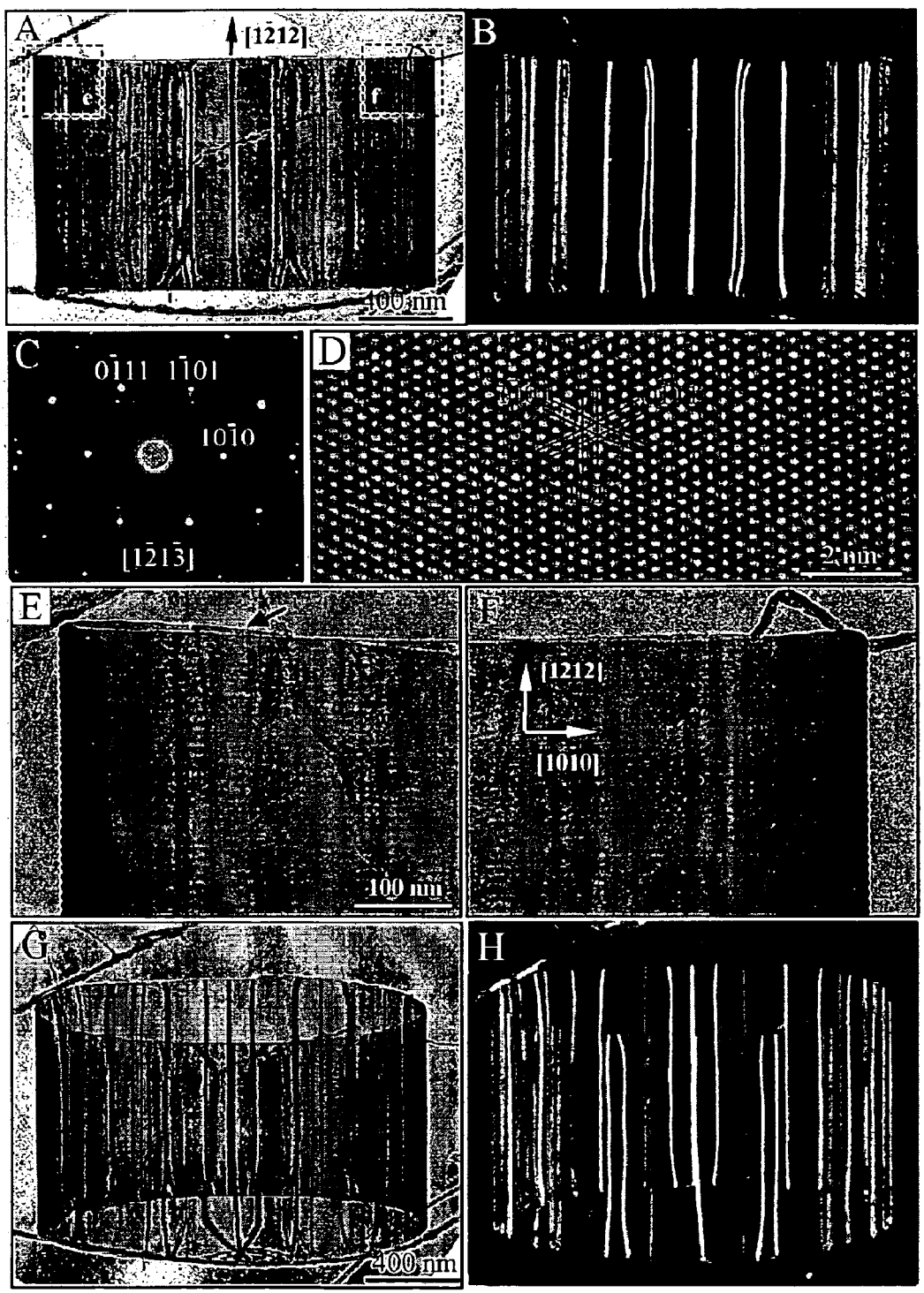
FIGS. 12A through 12H illustrate the structure of the type II ZnO single-crystal nanoring.

The type II nanoring structure is illustrated in FIG. 12A through 12H. Bright-field (FIG. 12A) and dark-field (FIG. 12B) TEM images unambiguously prove the single-crystal structure of the complete nanoring, which again implies that the nanoring shell is a uniformly-deformed single-crystal ribbon around the circumference. Electron diffraction (FIG. 12C) and the corresponding high-resolution TEM image recorded from the central region (FIG. 12D) show that the radial direction of the nanoring is [$1\bar{2}13$], tangential direction [$10\bar{1}0$] and nanoring plane ($1\bar{2}12$) (see the model in (FIG. 13A)), and there is no dislocation in the volume. FIGS. 12E and 12F display the enlarged view of the two corners indicated in FIG. 12A, which shows an end of the nanobelt (indicated by an arrowhead) and the screw coiling of the nanobelt. The pitch distance for the coiling is about 10 nm and the total number of loops is 100. The contrast produced by stacking faults parallel to the nanoring plane is visible, but the (0001) stacking fault plane is at an angle of about 28° from the nanoring axis. The nanoring has a thin crystal wall of thickness about 15 nm, as illustrated by tilting the nanoring for 15° (FIGS. 12G and 12H).

Figures 13A, 13B, 13C, 13D, 13E:
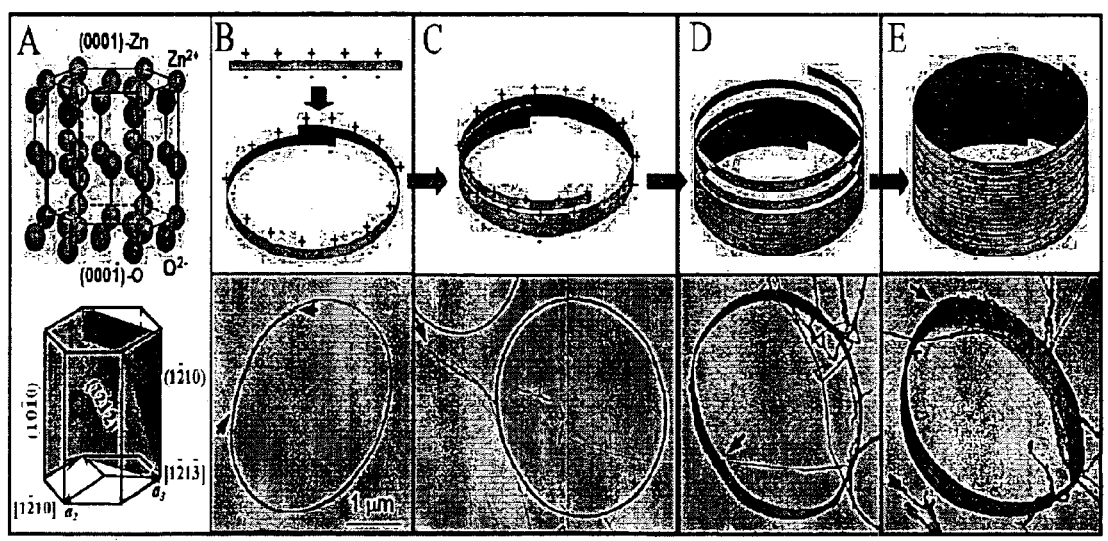
FIG. 13A illustrates a structure model of ZnO and the corresponding crystal planes showing the ±(0001) polar surfaces.
FIGS. 13B through 13E illustrate proposed growth processes and corresponding experimental results showing the initiation and formation of the single-crystal nanoring via self-coiling of a polar nanobelt.

The growth of the nanoring structures can be understood from the polar surfaces of the ZnO nanobelt. The wurtzite structured ZnO crystal is described schematically as a number of alternating planes composed of tetrahedral coordinated $O^{2-}$ and $Zn^{2+}$ ions, stacked alternatively along the c-axis (FIG. 13A). The oppositely charged ions produce positively charged (0001)-Zn and negatively charged ($000\bar{1}$)-O polar surfaces. The polar-nanobelt, which is the building block of the nanoring, grows along [$10\bar{1}0$], with side surfaces ±($1\bar{2}10$) and top/bottom surfaces ±(0001), and have a typical width of about 15 nm and thickness about 10 nm.

The stacking fault parallel to (0001) lowers the nanobelt energy and is the key for leading to the fastest anisotropic growth along [$10\bar{1}0$], but it does not affect the intrinsic polarity of the nanobelt. Therefore, the nanobelt has polar charges on its top and bottom surfaces (FIG. 13B). If the surface charges are uncompensated during growth, the nanobelt may tend to fold itself as its length increases in order to minimize the area of the polar surface. Although not intending to be bound by theory, one possible way of folding is to interface the positively charged (0001)-Zn plane (top surface) with the negatively charged (0001)-O plane (bottom surface), resulting in neutralization of the local polar charges and the reduced surface area, thus forming a loop with an overlapped end (as shown in (FIG. 13B)). The radius of the loop may be a result of how the nanobelt folds at the initial growth, but the size of the loop cannot be small to reduce the elastic deformation energy. Although not intending to be bound by theory, calculations show that the diameter should be no less than about 600 nm, and the experimental data show a low limit of about 800 nm. However, embodiments of the nanoring may have a diameter less than 600 nm. The total energy involved in the process coming from polar charges, surface area, and elastic deformation. The long-range electrostatic interaction is likely to be the initial driving force for folding the nanobelt to form the first loop for the subsequent growth, as suggested by calculations. From the SEM images, it is submitted that the first step (FIG. 13B) occurs before the nanoring landed onto the substrate.

The presence of a stacking fault within the nanobelt (see FIG. 11F) is the key for leading to the fast growth of the nanobelt along [$10\bar{1}0$], because it lowers the energy in the wurtzite-structured lattice. Although not intending to be bound by theory, as the growth continues, the nanobelt may be naturally attracted onto the rim of the nanoring due to electrostatic interaction and extends parallel to the rim of the nanoring to neutralize the local polar charge and reduce the surface area, resulting in the formation of a self-coiled, co-axial, uni-radius, multi-looped nanoring structure (FIG. 13C). The self-assembly is spontaneous, which means that the self-coiling along the rim proceeds as the nanobelt grows. The reduced surface area and the formation of chemical bonds (short-range force) between the loops stabilize the coiled structure. The width of the nanoring increases as more loops winding along the nanoring axis (FIG. 13D), and all of them remain in the same crystal orientation. Since the growth was carried out in a temperature region of about 200–400° C., "epitaxial sintering" of the adjacent loops forms a single-crystal cylindrical nanoring structure, and the loops of the nanobelt are joined by chemical bonds as a single entity. The loops that were coiled first remained at growth temperature for a longer time, resulting in higher crystallinity, while the ones that wound on later had less time for sintering and thus had relatively poorer crystallinity, forming the structure illustrated in FIG. 11G with two contrast regions across the width of the nanoring. Finally, as the growth time was extended, the entire nanoring exhibits a high quality crystallinity, as illustrated by the diffraction contrast observed in FIG. 13E. A uni-radius and perfectly aligned coiling is energetically favorable because of the complete neutralization of the local polar charges inside the nanoring and the reduced surface area. The entire growth process may have no relationship with the substrate used for collecting the sample.

The coiling process illustrated in FIGS. 13A through 13H unifies the two types of nanoring structures described in FIG. 11A through 11I and 12A through 12H. If the (0001) polar surface of the ZnO nanobelt is parallel to the ring-plane, self-coiling of the nanobelt at a radial direction of [$1\bar{2}10$] forms the type I structure presented in FIG. 11A through 11I. Alternatively, if the nanobelt is tilted towards the nanoring center so that the radial direction is [$1\bar{2}13$], self-coiling of the nanobelt produces the type II structure presented in FIGS. 2A through 12H. The tilting of the nanobelt may reduce the elastic deformation energy.

The model discussed here can also be adopted to explain the helical nanostructure discussed above. If the nanobelt in FIG. 13B is alternatively flipped for 90° so that the radial direction of the nanoring is [0001], which means that the polarization is in the radial direction, a bending of the nanobelt into a circle slightly reduces the electrostatic energy, possibly in favor of forming an in-plane spiral nanoring. Alternatively, as a result of preserved polar charges on the inner and outer arc surfaces, the circular loops of the nanobelt of the same diameter cannot be densely packed into a single-crystal coil structure due to electrostatic repulsion among them; instead, a helix structure would be formed with a pitch distance of about 200–500 nm (much larger than the width (about 20 nm) or thickness (about 10 nm) of the nanobelt), which is suggested to be a result of balancing the electrostatic repulsive force between the loops and the elastic deformation force.

The polar-charge induced nanorings presented here have potential applications in investigating fundamental physical phenomena, such as the Aharonov-Bohm oscillations in the exciton luminescence. The unique piezoelectric and semiconducting properties of ZnO predict that the nanorings could be nano-scale sensors, transducers, and/or resonators.

EXAMPLE 2

Tin Oxide

Single crystalline $SnO_2$ nanobelts of rutile structure can be fabricated by thermal evaporation of either $SnO_2$ powders (purity: 99.9%, melting point: 1630° C.) at 1350° C. and/or SnO powders (purity: 99.9%, melting point: 1080° C.) at 1000° C. After evaporation, white fuzz-like products are deposited on the alumina plate 38, whether the source material was $SnO_2$ or SnO. SEM imaging and EDS analysis show that the products are composed of large quantities of $SnO_2$ nanobelts (with lengths up to the order of millimeters) and a small fraction of Sn nanoparticles. XRD patterns from the synthesized $SnO_2$ nanobelt samples prove the rutile type structure with lattice constants of a=4.722 Å and c=3.184 Å, which are consistent with those of bulk $SnO_2$. TEM images display the characteristic shape (e.g. rectangular cross-section) of the $SnO_2$ nanobelts. Each nanobelt is uniform in width and height, and the typical widths of the $SnO_2$ nanobelts are in the range of about 50 to about 200 nanometers. Cross-sectional TEM observations show that the cross-sections of the $SnO_2$ nanobelts are substantially rectangular, with typical width-to-height ratios of about 5 to about 10. High-resolution TEM images reveal that the nanobelts are single crystalline and dislocation free. Electron diffraction pattern indicates that the $SnO_2$ nanobelt grows along [101], and it is enclosed by ±(010) and ±(10$\bar{1}$) crystallographic surfaces.

EXAMPLE 3

Indium Oxide

Thermal evaporation of indium oxide ($In_2O_3$) powders (purity: 99.99%, melting point: ~1920° C.) at 1400° C. yields $In_2O_3$ nanobelts. TEM observations show that most of the $In_2O_3$ nanobelts have uniform width and height along their lengths. However, some nanobelts exhibit a sharp shrinkage in width while the height is preserved and form a bridge-like structure, which may be used to measure transport from an oxide nanobridge. Typically, the $In_2O_3$ nanobelts have widths in the range of about 50 to about 150 nanometers and lengths of several tens to several hundreds of micrometers. Electron diffraction analysis shows that the $In_2O_3$ nanobelts are single crystalline, and grow along [001], the surfaces being enclosed by (100) and (010) surfaces.

EXAMPLE 4

Cadmium Oxide

Nanobelts of cadmium oxide (CdO) with sodium chloride (NaCl) cubic structure can be fabricated by evaporating (CdO) powders (purity: 99.998%, melting point: 1430° C.) at 1000° C. Besides CdO nanobelts, many single crystalline CdO sheets with sizes on the order of several to several tens of micrometers are also formed. These CdO sheets usually have shapes such as rectangles, triangles, and parallelograms. The lengths of the CdO nanobelts are usually less than about 100 micormeters, and their widths are typically about 100 to about 500 nanometers, significantly wider and shorter than those of ZnO, $SnO_2$ and $In_2O_3$ nanobelts, respectively. As a result, the width-to-height ratios of CdO nanobelts are usually greater than 10. Electron diffraction pattern shows that the nanobelts grow along [100], and their surfaces are enclosed by ±(001) and ±(010) facets. In addition, some nanobelts were broken into two halves during TEM observation due to electron beam illumination, which is likely to be caused by the easy cracking characteristic of the NaCl-type ionic structure of the nanobelt. Thus, it may be possible to cut these nanobelts with a focused electron or ion beam, so that nanobelts with specific lengths for nano-device applications could be fabricated.

EXAMPLE 5

Gallium Oxide

The synthesis of gallium oxide ($Ga_2O_3$) is based on thermal evaporation of gallium nitride (GaN) powders under controlled conditions in the presence of oxygen. The commercially supplied GaN powders (99.99% metals basis) are placed at the center of an alumina tube 36. The furnace is heated at a rate of about 10–15° C./min to about 1100° C., and then maintained at this temperature for 2 hours before cooled down to room temperature. The pressure in the alumina tube 36 is about 300 Torr, and the Ar flow rate is about 50 sccm. During evaporation, the products are deposited onto alumina plates 38, where the temperature is about 800–850° C. The as-deposited products are wool-like with a light gray color.

SEM analysis reveals that the products consist of a large quantity of nanostructures with typical lengths in the range of several tens to several hundreds of micrometers, while some of the nanostructures have lengths on the order of millimeters. The as-synthesized sample also contains a large fraction of nanosheets, and size of the nanosheets is about 10 micrometers across and several tens of nanometers in height. The nanosheets have straight edges with sharp corners, suggesting that they terminate by faceted crystallographic planes. Chemical microanalysis using EDS shows that the nanostructures obtained are $Ga_2O_3$. The formation of $Ga_2O_3$ rather than GaN is believed due to the high combinability of Ga with oxygen, which is believed to leak into the furnace.

The width of the nanobelts varies from about 40 to about 300 nanometers, and the geometry of the nanobelts is substantailly uniform. The height of the nanobelts is about 10 to about 60 nanometers depending on the width. The nanobelts are single crystalline and free from dislocations. Their surfaces are clean without an amorphous layer.

$Ga_2O_3$ is of polymorphism in its crystal structure. The polymorph of $Ga_2O_3$ mainly includes α-(R$\bar{3}$m, a=4.979 Å and c=13.429 Å), β-(C2/m, a=12.23 Å, b=3.04 Å, c=5.80 Å, and β=103.7 Å) and γ-$Ga_2O_3$ (Fd$\bar{3}$m, a=8.22 Å). Of those phases, the β-$Ga_2O_3$ is only stable modification. Some of the nanobelts are enclosed by ±(100) top and bottom surfaces and ±(10$\bar{1}$) side surfaces, while other nanobelts can be enclosed by ±(201) top and bottom surfaces and ±(010) side surfaces. It has been found that both the ±(010) and the ±(10$\bar{1}$) crystal planes can serve as the growth front of nanobelts with growth directions of [010] and [001], respectively. The growth front of the nanoribbon is ±(010) and the corresponding HRTEM image indicates a perfect crystallinity of the $Ga_2O_3$ nanobelt.

Nanosheets have some straight edges with corners of specific angles, typically of 45° and 90°. Some of the nanosheets are directly connected to nanobelts, indicating that they have the same structure. Electron diffraction shows that the nanosheets have the same crystal structure of β-Ga$_2$O$_3$ as that of nanobelts. The electron diffraction pattern demonstrates the corresponding [101] crystal zone of β-Ga$_2$O$_3$. The two perpendicular planes result in the rectangular- and L-shape structures. Beside the ±(010) and the ±(10$\bar{1}$) facets, a third-type of plane with about a 45° angle with respect to the two sides is also observed. This type of plane is identified to be the (21$\bar{2}$) plane from the electron diffraction pattern. The top and bottom surfaces are also the ±(100) crystal planes of β-Ga$_2$O$_3$. Based on our SEM observation, the height of the nanobelts and nanosheets are about 20–60 nanometers.

The growth morphology of Ga$_2$O$_3$ nanobelts and nanosheets is distinctively different from that of Ga$_2$O$_3$ nanorods and nanowires. The nanorods grown by thermal evaporation of a mixture of GaN, graphite and Ni particles have diameters of 5–10 nanobelts and growth directions of either [111] or [200]. The nanowires grown by an arc-discharge of GaN with the presence of Co and Ni particles have diameters of 20–30 nanobelts and a growth direction of [001]. The formation of nanobelts and nanosheets is a combined result of vapor-liquid-solid (VLS) and solid-solid (SS) growth kinetics.

EXAMPLE 6

Thermal evaporation of lead oxide (PbO) powders (purity: 99.99%) at about 950° C. yields PbO nanobelts. The thermal evaporation is conducted at 950° C. for 1 hour under a pressure of 300 Torr and Ar flowing at a flow rate of 50 sccm. The products deposited on the surface of the alumina plate 38 substrates are characterized by SEM, TEM, and EDS.

The as-synthesized products display a dark gray color that is distinctive from the yellow colored PbO source powders. SEM observations reveal that the products consist of a large quantity of belt-like nanostructures and faceted particles with diameters in the range of about 0.1 to about 2 micrometers. Chemical analysis by EDS indicates that the nanostructures are PbO$_2$ and the particles are metal Pb covered with a thin oxide layer.

TEM images show the morphology to be consistent with nanobelt morphology. The PbO$_2$ nanobelts are several tens to several hundreds of micrometers in length. Each nanobelt has a uniform width over its entire length, and the typical width of the nanobelts in the range of about 50 to about 300 nanometers. The height of the nanobelts varies with its width, and typically is in the range of about 10 to about 30 nanometers, as estimated by TEM observations. The width-to-height ratio of the nanobelts is about 5 to about 10.

It is noted that each nanobelt is connected with a Pb particle at its growth front, implying that the Pb tip likely acts as a catalyst in growth of the nanobelt. The diameter of the Pb tips is several times bigger than the width of connecting nanobelts. The Pb tips have the faceted geometrical shape of an octagonal projection, which indicates that Pb tips are crystalline and likely adopt the shape of truncated octahedron enclosed by (100) and (111) crystal planes because of lower surface energies.

PbO$_2$ can form two possible crystal structures (α and β) of orthorhombic and tetragonal lattice, respectively. Electron diffraction analysis and high resolution TEM imaging indicate that the as-synthesized PbO$_2$ nanobelt is single crystalline structure without dislocation and has a tetragonal structure (P4/mnm, a=4.961 Å and c=3.385 Å), i.e. β-PbO$_2$ nanobelts are formed. The nanobelt is enclosed by top surfaces ±(201) and side surfaces ±(10$\bar{1}$). The growth direction of the nanobelt is parallel to [010] with growth front (010).

The growth characteristics of the PbO$_2$ nanobelts is quite different from that of ZnO, SnO$_2$, In$_2$O$_3$, CdO and Ga$_2$O$_3$ nanobelts, in which no particle was found at the growth fronts of the nanobelts. This implies that a different growth mechanism be employed by the PbO$_2$ nanobelts. The growth of the former five oxide nanobelts may be governed by a vapor-liquid process. As to the PbO$_2$ nanobelts described here, however, the growth is likely to be controlled by vapor-liquid-solid process, which has been suggested for the nanowires grown by a catalytic-assisted technique, in which a metal particle is definitely located at the growth front of the wire and acts as the catalytic active site.

The dominant orientation relationship between the PbO$_2$ and the PbO is determined to be (010)$_2$||(100)$_1$ and [101]$_2$|| [001]$_1$. Another preferable orientation of the PbO phase precipitation is 45° relative to the former case.

The PbO$_2$ nanobelts have been determined to be enclosed by top surfaces ±(201) and side surfaces ±(10$\bar{1}$). The growth direction of the nanobelts is parallel to [010], along with a typical length of several hundred micrometers, width of 50 to 300 nanometers and width-to-height ratio of 5 to 10. Each PbO$_2$ nanobelt is found to have a large polyhedral Pb tip at its growth front, suggesting that the growth of the PbO$_2$ nanobelts is likely controlled by a vapor-liquid-solid mechanism. The PbO$_2$ nanobelts and the crystalline Pb tips are very sensitive to electron beam irradiation, resulting in the phase transformation from PbO$_2$ to PbO, melting of the Pb tips and formation of Pb nanocrystals under a high vacuum condition.

It should be emphasized that the above-described embodiments of the present invention, particularly, any embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A nanostructure, comprising:
   a free-standing, helical semiconductor oxide nanostructure including a nanobelt having a substantially rectangular cross-section, wherein the nanobelt is about 5 nanometers to about 200 nanometers in width and about 3 nanometers to about 50 nanometers in height, and wherein the radius of the helical semiconductor oxide nanostructure is about 200 to 5000 nanometers.

2. The nanostructure of claim 1, wherein the semiconductor oxide is chosen from oxides of zinc, cadmium, mercury, gallium, indium, tellurium, germanium, tin, and lead.

3. The nanostructure of claim 1, wherein the semiconductor oxide is zinc oxide.

4. The nanostructure of claim 1, wherein the nanobelt is a single crystalline structure.

5. The nanostructure of claim 1, wherein the nanobelt is a polar surface dominated zinc oxide nanobelt.

6. The nanostructure of claim 1, wherein the nanobelt includes polarized ±(0001) facets.

7. The nanostructure of claim 1, wherein the nanobelt has a substantially uniform width along the length of the free-standing helical semiconductor oxide nanostructure.

8. The nanostructure of claim 1, wherein the semiconductor oxide is zinc oxide, wherein the nanobelt has a top ±(0001) surface, bottom ±(000$\bar{1}$) surface, a right side ±(10$\bar{1}$0) surface, and a left side ±(10$\bar{1}$0) surface.

9. The nanostructure of claim 1, wherein the semiconductor oxide is zinc oxide, wherein the nanobelt is described by characteristics selected from an interior (0001)-Zn surface and an exterior (000$\bar{1}$)-O surface, and an interior surface (000$\bar{1}$)-O and exterior surface (0001)-Zn.

10. A nanostructure comprising:
  a free-standing semiconductor oxide nanoring, wherein the nanoring has a radius of about 500 to 10,000 nanometers, a height of about 5 to 2000 nanometers, and a width of about 50 to 7500 nanometers.

11. The nanostructure of claim 10, wherein the semiconductor is chosen from ZnS, GaN, CdSe, and oxides of zinc, cadmium, gallium, indium, tin, lead, and, and combinations thereof.

12. The nanostructure of claim 10, wherein the semiconductor oxide is zinc oxide.

13. The nanostructure of claim 12, wherein the nanoring includes a nanobelt having a substantially rectangular cross-section, wherein the nanobelt is about 5 nanometers to about 200 nanometers in width and about 3 nanometers to about 50 nanometers in height.

14. The nanostructure of claim 13, wherein the nanoring includes about 1 to 250 loops of the nanobelt.

15. The nanostructure of claim 13, wherein the semiconductor oxide is zinc oxide, and wherein the nanobelt includes a top ±(000$\bar{1}$) surface, a bottom ±(0001) surface, a right side ±(1$\bar{2}$10) surface, and a left side ±(1$\bar{2}$10) surface.

16. The nanostructure of claim 13, wherein the semiconductor oxide is zinc oxide, wherein the nanobelt has an interior (0001)-Zn surface and an exterior ±(000$\bar{1}$)-O surface.

17. The nanostructure of claim 11, wherein the nanoring is a single crystalline structure.

* * * * *